United States Patent
Modi et al.

(10) Patent No.: US 11,057,486 B2
(45) Date of Patent: Jul. 6, 2021

(54) CONTENT-BASED NOTIFICATION DELIVERY

(71) Applicant: Facebook, Inc., Menlo Park, CA (US)

(72) Inventors: Kunal Nikhil Modi, Fremont, CA (US); John Torres Fremlin, Walnut, CA (US); David J. Capra, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 153 days.

(21) Appl. No.: 16/125,414

(22) Filed: Sep. 7, 2018

(65) Prior Publication Data

US 2019/0082024 A1    Mar. 14, 2019

Related U.S. Application Data

(63) Continuation of application No. 15/085,920, filed on Mar. 30, 2016, now Pat. No. 10,091,318.

(51) Int. Cl.
*G06F 15/16* (2006.01)
*H04L 29/08* (2006.01)
*H04L 12/58* (2006.01)
*H04L 29/06* (2006.01)
*G06F 16/951* (2019.01)
*G06F 16/23* (2019.01)
*G06F 16/2457* (2019.01)
*G06Q 50/00* (2012.01)
(Continued)

(52) U.S. Cl.
CPC .......... *H04L 67/26* (2013.01); *G06F 16/2358* (2019.01); *G06F 16/24578* (2019.01); *G06F 16/951* (2019.01); *G06F 21/6245* (2013.01); *G06Q 30/0241* (2013.01); *G06Q 50/01* (2013.01); *H04L 51/24* (2013.01); *H04L 51/32* (2013.01); *H04L 63/20* (2013.01); *H04L 67/02* (2013.01); *H04L 67/20* (2013.01); *H04L 67/306* (2013.01); *G06F 2221/2111* (2013.01); *H04L 63/102* (2013.01)

(58) Field of Classification Search
None
See application file for complete search history.

(56) References Cited

U.S. PATENT DOCUMENTS 9,608,955 B2 *   3/2017   Dyor ...................... H04L 67/18
9,984,386 B1 *   5/2018   Bhatia ................... G06Q 30/01
(Continued)

*Primary Examiner* — Phuoc H Nguyen
(74) *Attorney, Agent, or Firm* — Van Pelt, Yi & James LLP

(57) ABSTRACT

In one embodiment, a method includes one or more computing devices ranking multiple users of a social-networking system based on one or more criteria associated with a spotlight content item, wherein the spotlight content item is associated with a node in a social graph associated with the social-networking system, and wherein at least one of the criteria is based on social-networking information for each of the user, verifying the ranked users, wherein the verifying comprises confirming or eliminating each of the ranked users based on recent interactions by the ranked users with social-networking information corresponding to the node associated with the spotlight content item, and sending a notification about the spotlight content item to each of the confirmed users in accordance with a batching protocol, wherein the batching protocol is determined based at least in part on rankings for each of the confirmed users.

20 Claims, 8 Drawing Sheets

(51) Int. Cl.
   *G06Q 30/02*      (2012.01)
   *G06F 21/62*      (2013.01)

(56) References Cited

U.S. PATENT DOCUMENTS

| | | | | |
|---|---|---|---|---|
| 2009/0150489 A1* | 6/2009 | Davis | G06Q 10/107 | 709/204 |
| 2013/0110637 A1* | 5/2013 | Bott | G06F 16/9574 | 705/14.64 |
| 2014/0230025 A1* | 8/2014 | Abhyanker | G06Q 10/087 | 726/4 |
| 2014/0372525 A1* | 12/2014 | Raghavan | H04L 65/1069 | 709/204 |
| 2015/0304437 A1* | 10/2015 | Vaccari | G06F 17/30268 | 709/204 |
| 2016/0171540 A1* | 6/2016 | Mangipudi | G06Q 30/0255 | 705/14.53 |
| 2017/0286915 A1* | 10/2017 | Yamaguchi | G06Q 30/02 | |

* cited by examiner

CONTENT-BASED NOTIFICATION DELIVERY

PRIORITY

This application is a continuation under 35 U.S.C. § 120 of U.S. patent application Ser. No. 15/085,920, filed 30 Mar. 2016.

TECHNICAL FIELD

This disclosure generally relates to delivering notifications to users.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a notification system may quickly deliver a time-sensitive notification about a just-posted content item ("a spotlight content item") to a large number of users of a social-networking system. Based on the spotlight content item, the notification system may identify one or more groups of users as candidate recipients of the notification, prioritize the users based on a plurality of factors such as their levels of interest in the spotlight content item and their likelihood of interacting with the spotlight content item, and deliver the notification to the users according to the prioritization in order to ensure that as many members of the desired audience of the spotlight content item as possible are notified about the spotlight content item in a timescale consistent with requirements of the spotlight content item. In particular embodiments, the notification system may analyze social-networking information to identify candidate notification recipients and prioritize them. In particular embodiments, elements of the notification system may be implemented as part of the social-networking system. In particular embodiments, elements of the notification system may be implemented as part of a third-party system.

In particular embodiments, for a spotlight content item, the notification system may conduct multiple rounds of notification delivery to candidate recipients associated with different priority levels. In particular embodiments, the notification system may access one or more data sources containing user information, wherein the data sources are precomputed or created in real time. The users in each data source may be ranked according to a set of criteria. In particular embodiments, the notification system may aggregate user information from one or more data sources, sort the corresponding users into batches, and feed the batches into a clustered computer system for parallel delivery of the notification. Each node of the clustered computer system may perform a series of checks on the user information to verify that notification delivery to each candidate recipient is appropriate. In particular embodiments, a controlling module of the notification system may control the pace of notification delivery based at least on a status of the spotlight content item and feedbacks from notification recipients.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
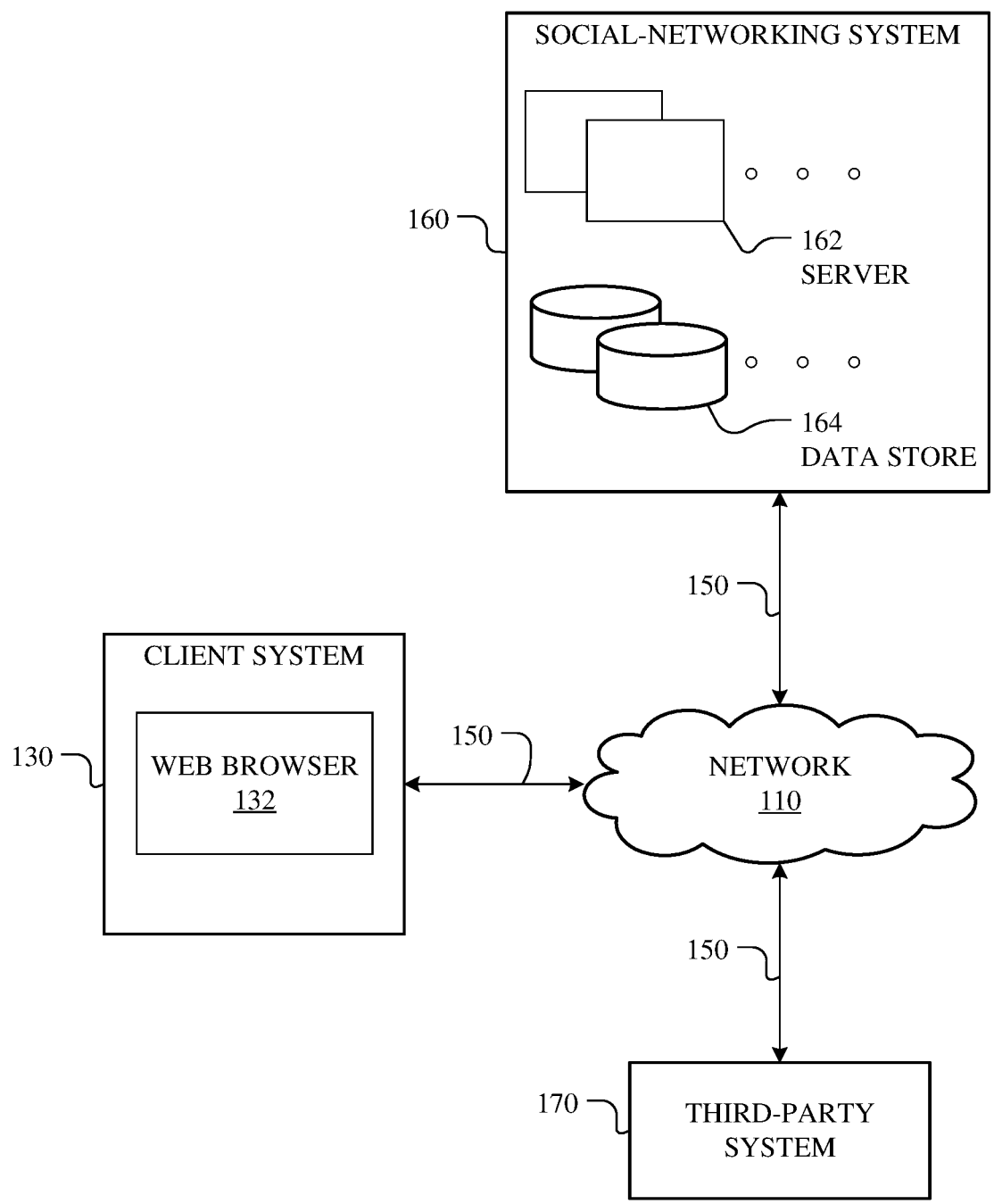
FIG. 1 illustrates an example network environment associated with a social-networking system.

In particular embodiments, a notification system may quickly deliver a time-sensitive notification about a just-posted content item ("a spotlight content item") to a large number of users of a social-networking system. Based on the spotlight content item, the notification system may identify one or more groups of users as candidate recipients of the notification, prioritize the users based on a plurality of factors such as their levels of interest in the spotlight content item and their likelihood of interacting with the spotlight content item, and deliver the notification to the users according to the prioritization in order to ensure that as many members of the desired audience of the spotlight content item as possible are notified about the spotlight content item in a timescale consistent with requirements of the spotlight content item. In particular embodiments, the notification system may analyze social-networking information to identify candidate notification recipients and prioritize them. In particular embodiments, elements of the notification system may be implemented as part of the social-networking system. In particular embodiments, elements of the notification system may be implemented as part of a third-party system.

In particular embodiments, for a spotlight content item, the notification system may conduct multiple rounds of notification delivery to candidate recipients associated with different priority levels. In particular embodiments, the notification system may access one or more data sources containing user information, wherein the data sources are precomputed or created in real time. The users in each data source may be ranked according to a set of criteria. In particular embodiments, the notification system may aggregate user information of the users from one or more data sources, sort the corresponding users into batches, and feed the batches into a clustered computer system for parallel delivery of the notification. Each node of the clustered computer system may perform a series of checks on the user information to verify that notification delivery to each candidate recipient is appropriate. In particular embodiments, a controlling module of the notification system may control the pace of notification delivery based at least on a status of the spotlight content item and feedbacks from notification recipients.

In particular embodiments, a spotlight content item may be made available on the social-networking system. The spotlight content item may be created and posted on the social-networking system by a user. It may alternatively be stored on a third-party system and linked to the social-networking system. The spotlight content item may be associated with privacy settings specifying the accessibility to the spotlight content item. The spotlight content item may be of one of a plurality of formats, which may comprise a text-based post, an image, a video and/or audio recording, a live video broadcast, or a downloadable software product or service. The spotlight content item may be made available on the social-networking system in a plurality of ways, which may comprise a post on a profile page, a link in a status update, an advertisement, an email from the social-networking system, or a message from a third-party application of the social-networking system. The social-networking system may allow a user to interact with the spotlight content item in a variety of ways, which may comprise reading, watching, downloading, commenting on, liking, or sharing the spotlight content item. The spotlight content item may be associated with one or more user nodes or concept nodes in a social graph associated with the social-networking system. For example, the spotlight content item may be associated with its creator, one or more individuals involved in the spotlight content item, a profile page that it is posted on, or a group interested in a topic related to the spotlight content item. In particular embodiments, the spotlight content item may be associated with a timescale. The timescale may be defined by an availability of the spotlight content item, a duration of the spotlight content item, an interest span of an intended audience of the spotlight content item, or an intent of a creator of the spotlight content item. In particular embodiments, a timescale associated with a spotlight content item may be so short that quick delivery of notifications about the spotlight content item to its potential audience may be required. As an example and not by way of limitation, the spotlight content item may be a live video broadcast involving a celebrity (e.g., an interview of the celebrity). The live video broadcast may be made available on the social-networking system by being posted on a profile page of the celebrity. The live video broadcast may be associated with social-graph nodes corresponding to the profile page, the celebrity, an interviewer, and a sponsor of the program. The live video broadcast may be associated with a timescale of, for example, 15 minutes, which is the duration of the interview. As another example and not by way of limitation, the spotlight content item may be a beta software product or service which has recently been released by a developer. The beta software may be made available on the social-networking system through a link in a status update of the developer, inviting downloads of the beta software. The beta software may be associated with social-graph nodes corresponding to the developer, a software family of the beta software, and the beta software's competitors. The beta software may be associated with a timescale of, for example, one hour, which is a period in which the developer intends to invite a certain number of downloaders. Alternatively, the beta software may be associated with a timescale of, for example, three months, during which it is available for download. As yet another example and not by way of limitation, the spotlight content item may be a breaking news article in text format, which may be posted on the social-networking system or a third-party website (and linked to the social-networking system). The breaking news may be associated with social-graph nodes corresponding to one or more individuals involved in the news, one or more writers of the news article, the time, location, or topic of the breaking news.

In particular embodiments, in response to a spotlight content item becoming available on the social-networking system, the notification system may access one or more data sources containing user information. The user information obtained by the notification system, which may be subject to corresponding privacy settings, may comprise social-networking information such as identification information, profile information, an interaction history with content items, and a history of receiving notifications. The data sources may be implemented on one or more data stores of the social-networking system. Alternatively, the data sources may be implemented on a third-party system. In particular embodiments, a data source may be associated with the spotlight content item. The relationship between the data source and the spotlight content item may be based on a creator of the spotlight content item, an individual involved in the spotlight content item, a topic of the spotlight content item, a characteristic of the spotlight content item, or a location (physical or network) of the spotlight content item. As an example and not by way of limitation, a data source may comprise information about all followers of a celebrity's profile page. This data source may be associated with a live video broadcast posted on the celebrity's profile page based on a network location of and an individual involved in the live video broadcast. As another example and not by way of limitation, a data source may comprise information about all users who list "basketball" as an interest. This data source may be associated with a news article about a basketball team based on a topic of the spotlight content item. As yet another example and not by way of limitation, a data source may comprise information about users of a particular age range. This data source may be associated with a video posted by a user within the selected age range based on the similarity between the posting user and the notified users. Other data sources associated with the video may comprise information about users who are similar to or otherwise related to the posting user in other aspects (e.g., language spoken, nationality, hometown, alma mater, etc.). A data source may be precomputed by the social-networking system offline, updated regularly, and stored. A relationship between the data source and a spotlight content item may be established when the spotlight content item is made available on the social-networking system. Alternatively, a data source may be created in real time in response to the creation or posting of a spotlight content item. The data source may be populated with users associated with the spotlight content item. As an example and not by way of limitation, the social-networking system may maintain a fans list comprising followers of a celebrity's profile page. This fans list may be associated with a just-posted live video broadcast involving the celebrity when the video broadcast is made available on the social-networking system. As another example and not by way of limitation, the notification system may maintain a data source comprising information about users who are determined to be interested in a particular news topic. This data source may be associated with a news article of the topic when such an article is published on the social-networking system. Particular data sources may be suitable for real-time creation rather than pre-computation. As an example and not by way of limitation, when a live video broadcast involving a celebrity is made available on the social-networking system, the notification system may create a data source comprising information about the most recent interactors with the celebrity's profile page in real time. Because the availability of the particular type of spotlight content item may be unpredictable, precomputing and maintaining such a data source may be costly and inefficient. As another example and not by way of limitation, when a breaking news article is published on the social-networking system, the notification system may create a data source comprising information about users who are located within a certain distance from the location of a breaking news event. It may only be feasible to create such a data source in real time because too much storage space is required for maintaining data sources covering all locations.

In particular embodiments, users in one or more data sources may be ranked based on one or more criteria associated with a spotlight content item. One or more criteria may be based on social-networking information for each of the users. The ranking of each user may be precompute or be determined in real time. The users of more than one data sources may be ranked collectively or separately (e.g., within each data source). A ranking module that determines the users' rankings may be implemented as a component of the notification system, the social-networking system, or a third-party system. In particular embodiments, a criterion may comprise a type of relationship between a node representing each user and a node associated with the spotlight content item, an interaction history between each user and the node associated with the spotlight content item, or an interaction history between each user and one or more content items determined to be similar to the spotlight content item. As an example and not by way of limitation, a data source may comprise information about all users who have commented on a celebrity's profile page during the past three months. The users may be ranked on their levels of interest in the celebrity, thus their likelihood of interacting with a just-posted video of the celebrity. Ranking the users may be based at least in part on each user's interaction history (which is social-networking information) with the celebrity's profile page, in particular, each user's number of comments in the past three months. As another example and not by way of limitation, a data source may comprise information about users connected to a software developer on the social-networking system. The users may be ranked on their likelihood of downloading a new beta software product or service released by the developer. Ranking the users may be based on a combination of the length of each user's connection with the developer and a record of whether each user downloaded a previous beta software product or service released by the developer. As yet another example and not by way of limitation, users in a data source comprising information about members of a topic-based group and a data source comprising information about individuals located near the occurrence of a breaking news event may be combined and ranked together. They may be ranked on their levels of interest in the breaking news event. Ranking the users may at least be partially based on an affinity coefficient between each user and a node corresponding to the breaking new event. In particular embodiments, a criterion may be based on information that may be obtained from a client system of each user, such as a type of the client system, a capability of the client system in displaying a particular type of media, a type of I/O device equipped on the client system, a connectivity to the internet, or a reading of a sensing device equipped on the client system. Such information may be obtained by the social-networking system with proper authorization from the users. In particular embodiments, such information may be obtained in real time and be used to dynamically rank users. As an example and not by way of limitation, for a video spotlight content item requiring high bandwidth to stream, users in one or more data sources may be ranked based at least in part on the speed of their internet connections. As another example and not by way of limitation, for a spotlight content item that is a beta software product or service designed for use on a laptop or desktop computer, users in one or more data sources may be ranked based at least in part on a type of device that each user has.

In particular embodiments, the notification system may comprise a queuing module, operable to aggregate and distribute user information obtained from one or more data sources. The queuing module may comprise multiple components each covering a particular type of functionality. The queuing module may be operable to select a particular data source to access at a particular time and determine a number of users to obtain from the data source. Alternatively, the source selection module may determine an order of the data sources to access. The order of the data sources may be determined based on one or more rules. The rules may be based on a relationship between each data source and the spotlight content item, a time it takes to access or create each data source, a size of each data source, or a method of ranking associated with each data source. As an example and not by way of limitation, the notification system may access three data sources to obtain user information. The queuing module may obtain a fixed number of top-ranked users from each data source and switch to access the next data source until a desired number of users have been obtained or a termination time point is reached. As another example and not by way of limitation, the queuing module may first determine that only a first data source is available and start to access user information in the first data source. The queuing module may later determine that a second data source with a higher priority level is available and switch to access user information in the second data source immediately. In particular embodiments, the queuing module may aggregate user information obtained from more than one data sources and sort them into a list for notification delivery. The sorted list of users may be created based on a set of predetermined rules. For example, the rules may direct the notification system to order the users based on a ranking of each user within a data source and the order of data sources. In particular embodiments, the queuing module may further be operable to perform deduplication on user information obtained from more than one data sources. When information about a particular user is obtained from at least two different data sources, the queuing module may remove redundant instances of user information. This prevents the costly and inelegant occurrence of delivering a same notification to a particular user twice. In particular embodiments, the queuing module may maintain a record of identification information for all users who have been delivered a particular notification or who have been scheduled to receive the notification and compare each newly-accessed user with the record. In particular embodiments, the queuing module may access more than one set of users from different data sources and combine the sets of users through a union set operation to remove redundant user information. In particular embodiments, the queuing module may be operable to place the sorted list of users into one or more batches according to a batching protocol. The batches may then be sent to a clustered computer system, which is operable to deliver notifications to users received from the queuing module in a parallel manner. The batching protocol may be based at least in part on users' rankings. In particular embodiments, the batches and users in each batch may be ordered. The queuing module may determine the orders based on a plurality of factors, which may comprise the ranking of each user within the user's data source, the time of access for the data source, the importance of a data source, a relationship between a data source and the spotlight content item, or the fairness among different data sources. For example, the batching module may start by batching top-ranked users of a data source that arrived first, stop after a particular number of users has been processed, and begin batching top-ranked users of a data source that arrived second. In particular embodiments, the queuing module may further be operable to determine a number and size of batches to create each time. This may be done by balancing one or more factors, which may comprise an interest in expanding the overall notification recipient pool to be as large as possible, an interest in notification delivery speed, which may favor smaller batches, and the limitation of the infrastructure, which may limit the number of batches that the notification system may possibly break user information into. Alternatively, the number and size of batches may be based on explicit instructions. Particularly, a sender of a notification or a creator of the spotlight content may specifically instruct the notification system as to the number and size of batches based on the desired audience of the spotlight content. In particular embodiments, the queuing module may further be operable to control the speed of transmitting user information to the clustered computer system, which may then influence the speed of delivering notifications to the users. The queuing module may be operable to determine an appropriate speed of transmitting user information based on a plurality of factors, which may comprise a status of the spotlight content item, an availability of one or more data sources, a load on the clustered computer system, one or more competing notifications to deliver, or feedbacks from one or more notification recipients.

In particular embodiments, the notification system may comprise a clustered computer system for user verification and notification delivery. Each node of the clustered computer system may receive one or more batches of user information from the queuing module and cache the received user information in one or more data storage devices. In particular embodiments, each node may be operable to verify each received user against one or more requirements associated with the spotlight content item to determine whether delivering a notification to the user is appropriate. The verification process may comprise checking user information received from the queuing module, social-networking information directly obtained from the social-networking system, or device information obtained from a client system of the user. The social-networking information may comprise recent interactions by the user with social-networking information corresponding to a node associated with the spotlight content item. The recent interactions may comprise liking a content item associated with the node, commenting on a content item associated with the node, sharing a content item associated with the node, visiting a profile page associated with the node, or subscribing to or unsubscribing from a service associated with the node. If the user satisfies each requirement, the node may confirm and send the notification to the user. On the other hand, if the user fails to satisfy any requirement, the node may eliminate the user from a list of candidate notification recipients. In particular embodiments, verifying a user may comprise checking privacy settings of the user to ensure compliance, checking the connectivity to the social-networking system of one or more devices associated with the user to ensure capability of receiving the notification, determining the characteristics of one or more devices associated with the user to ensure capability of accessing the spotlight content item, or determining whether a number of recent notifications received by the confirmed user exceeds a threshold. As an example and not by way of limitation, for a spotlight content item of a video format, a node of the clustered computer system may check a capability of one or more client systems that each user is currently using. It may confirm each user that is using a device capable of displaying the spotlight content item with a desirable resolution and eliminate other users. As another example and not by way of limitation, if the spotlight content item is a live video broadcast posted on a celebrity's profile page, a node may receive a list of users who have interacted with the profile page. It may check whether each received user has recently unsubscribed from a news feed about the celebrity. It may eliminate each user who has recently unsubscribed from a candidate recipient list. As yet another example and not by way of limitation, if the spotlight content item is a breaking news article, for each received user, a node may check social-networking information to determine a history of news notifications received by the user in a period (e.g., the past 24 hours). If the user has received more than a threshold number (e.g., 20) of news notifications during the period, the user may be eliminated from a candidate recipient list of the current notification.

In particular embodiments, the verification process may necessitate redistributing users among one or more batches before sending a notification to the users to achieve fair and efficient use of computing resources. As an example and not by way of limitation, when a substantial percentage of users in two batches are eliminated in the verification process, the remaining users of one batch may be combined with the remaining users of another batch to form a new, fuller, batch. This may free up one node of the clustered computer system for other tasks. As another example and not by way of limitation, when more users are eliminated from one batch than another, users in the batch with more remaining users may be redistributed to the batch with fewer remaining users. As a result, two nodes hosting the two batches may spend similar amounts of time in notification delivery. In particular embodiments, each node of the clustered computer system may send a batch of confirmed users back to the queuing module. The queuing module may then place the confirmed users into a plurality of batches and send the batches back to the clustered computer system for notification delivery. Alternatively, the notification system may comprise an additional layer of software, which is separate from the queuing module, for the batching of confirmed users. This additional layer of software may receive confirmed users from the clustered computer system, re-batch the received users, and send the resulting batches back to the clustered computer system or to a notification distribution service for notification delivery.

In particular embodiments, each node of the clustered computer system may send a notification about the spotlight content item to each of the confirmed users in accordance with a batching protocol. Collectively, the notification may be delivered to a plurality of users in a parallel manner through the simultaneous operations of each node of the clustered computer system. The notification system may deliver the notification to recipients directly or through a notification distribution service. The order of delivery may be controlled by an order of batches and an order of users within each batch as determined by the queuing module. An example notification may contain the entire spotlight content item, a part or a representation of the spotlight content item, or an interactive element directing the user to the location of the spotlight content item or allowing the user to interact with the spotlight content item.

In particular embodiments, the notification distribution service may deliver notifications received from the notification system to a user in a user-aware manner. The notification distribution service may utilize different techniques to attempt to provide a notification to a user in a manner that increases the likelihood that the user will interact with the notification (e.g., a "click-through" action whereby the user clicks on a link presented in a visual notification to access a spotlight content item), which hopefully increases the likelihood that a "conversion" takes place—that the user takes some final action that is the ultimate goal of delivering the notification (e.g., completes an action, such as watching a live video broadcast, downloading a software product, or commenting on/sharing a breaking news article). A policy engine of the notification distribution service may assess a number of different factors in order to determine delivery instructions for a notification. The accessed factors may include not only (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user), but also (3) historical notification information about this particular user's responses to past notifications (e.g., conversion rates for different notification/context/delivery patterns), about prior context/delivery patterns (if any) for the current notification, and about interaction levels (if any) for those prior context/delivery patterns (e.g., duration of watching a video, quickness in downloading a software product, social interactions with a post). Based on the delivery instructions, the notification distribution service may deliver the notification in accordance with a specified context/delivery pattern. The context/delivery pattern may provide instructions regarding when to send the notification (e.g., day, time, ideal delivery context), how to send the notification (e.g., which delivery channels should be utilized), a maximum duration beyond which the notification should be re-delivered, when and how to re-deliver the notification in the absence of user interaction and/or successful conversion, or whether to deliver the notification. In connection with a notification distribution service, particular embodiments may utilize one or more systems, components, elements, functions, methods, operations, or steps disclosed in U.S. patent application Ser. No. 14/567,218, filed 11 Dec. 2014, which is incorporated by reference.

In particular embodiments, the notification system may comprise a controlling module which is operable to control the pace of notification delivery. Depending on factors such as a status of the spotlight content item, a status of a competing content item, statistics about a network used for delivering the spotlight content item, feedbacks from notification recipients, and a goal of the creator of the spotlight content item, the controlling module may start, terminate, pause, resume, accelerate, or decelerate the notification delivery process. In addition, the controlling module may dynamically alter a priority level assigned to each data source. Example embodiments of the controlling module may log information about user interactions with one or more initial batches of the sent notifications, wherein the logged information comprise a type and timing information for each of the interactions and adjust distribution of subsequent batches of notifications in accordance with the logged information. Example embodiments of the controlling module may also dynamically or periodically monitor a status of the spotlight content item (e.g., the quality of a video) and obtain statistics about a network used for delivering the spotlight item (e.g., location-based load or speed of a content delivery network or "CDN"). It may then adjust the distribution of notifications dynamically based on real-time data gathered therefrom. The controlling module may work on different components of the notification system. It may operate by controlling the selection or access of data sources, the aggregation and batching of user information at the queuing module, the transfer of user information from the queuing module to the clustered computer system, or the delivery of notifications from the clustered computer system to users. As an example and not by way of limitation, if a creator of a spotlight content item intends to attract a certain number of users to like the spotlight content item in a particular time period, the controlling module may access social-networking information associated with the spotlight content item, in particular, a count of like's on the spotlight content item over time. It may derive a correlation between the number of likes and the number of notifications sent and accelerate or decelerate the notification delivery process based on its estimation regarding a progress toward the content creator's target. Furthermore, the social-networking information may also be used by the controlling module to optimize data sources to access. For example, based on instructions from the controlling module, the notification system may create, in real time, a data source comprising information about users whose friends have liked the spotlight content item and deliver the notification to users in the newly-created data source. As another example and not by way of limitation, for a spotlight content item that is a live video broadcast that is transmitted to the social-networking system in real time, the quality of the video may fluctuate depending on the video's quality at the source (e.g., a smartphone equipped with a video camera) and the stability of the network via which the video is transmitted from its source to the social-networking system. The controlling module may monitor the status of the live video broadcast on the social-networking system in real time. It may accelerate notification delivery when the video is determined to be in good quality and may decelerate or pause notification delivery when the video is determined to be in bad quality (e.g., interrupted, blurred). As yet another example and not by way of limitation, a spotlight content item may be made available to users worldwide through a CDN. The controlling module may monitor the loads on the servers of the CDN that are located in different regions of the world and statistically analyze information obtained during the process. As soon as the controlling module determines that the servers located in a particular region of the world are swamped or overloaded, it may decelerate or pause notification delivery to users located in the region and redistribute some notifications to users in other regions.

In particular embodiments, the notification system may further comprise a feedback module operable to optimize notification delivery. The feedback module may assess effectiveness of particular instances of notification delivery and modify data or algorithms associated with the notification system. In particular embodiments, the feedback module may determine one or more actions of one or more users associated with the spotlight content item after receiving the notification and update the ranking of one or more users in one or more data sources based on the determined actions. For example, the feedback module may access social-networking information and determine that a particular user has always visited a profile page associated with a spotlight content item of a particular type within 10 minutes after receiving a notification about the spotlight content item. The feedback module may up-rank the user in a precomputed data source associated with the type of content items. Alternatively, the feedback module may update an algorithm of the notification system based on one or more determined actions of one or more users. For example, the notification system currently may obtain information about 10,000 top-ranked users in a first data source before starting to access a second data source. In an example case, the feedback module may determine that only the notifications to the 1,000 top-ranked users yield a high percentage of actual visits to a spotlight content item. The feedback module may then modify the notification system so that, for a similar spotlight content item, the second data source is accessed right after information about only 1,000 top-ranked users of the first data source is obtained.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIRE-FOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. Information included in the received communications may be subject to the user's privacy settings. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
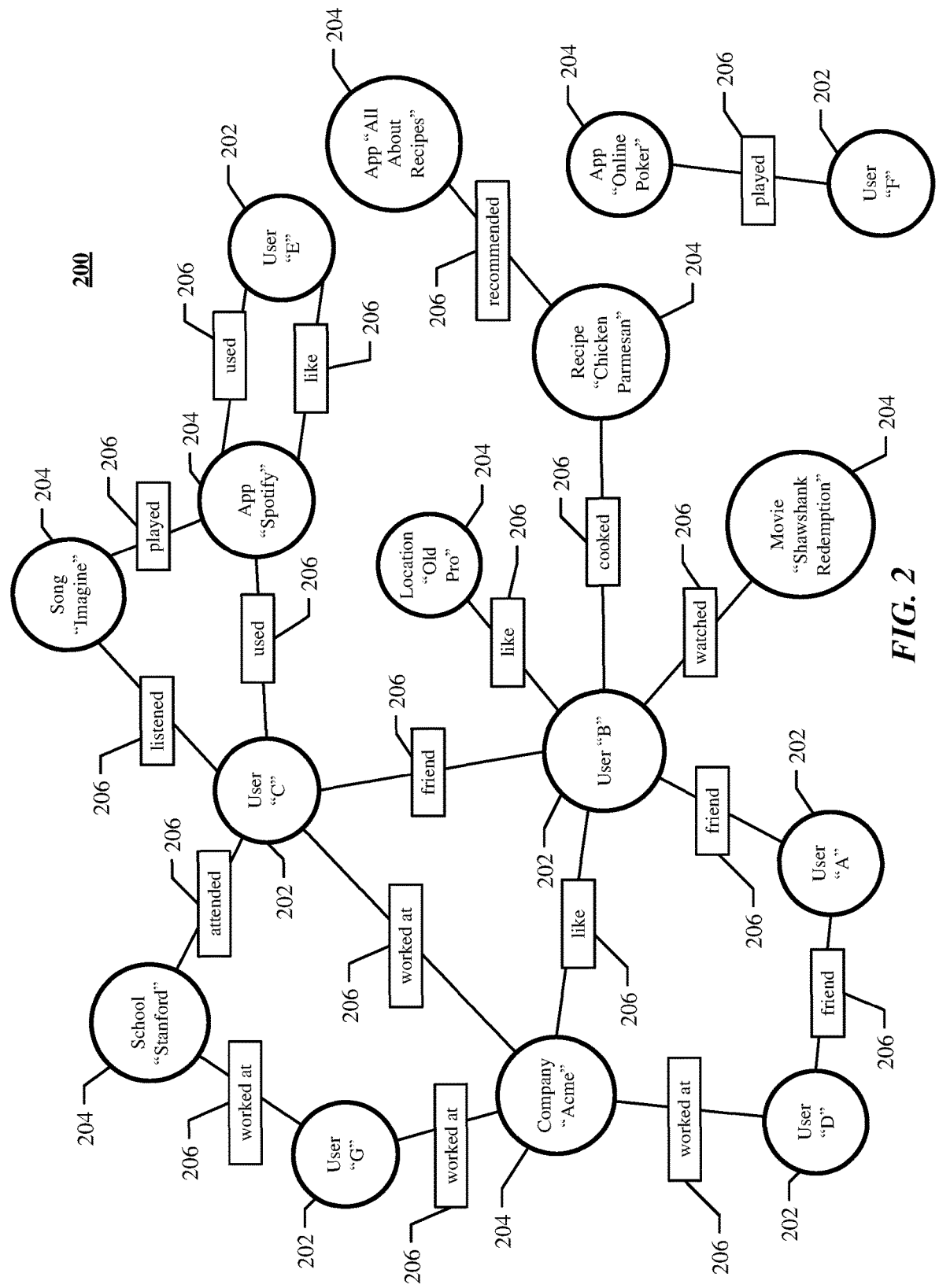
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message and subject to privacy settings of the user, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. The continued monitoring of actions or relationships may be subject to privacy settings associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored to an extent allowed by privacy settings associated with the user. Particular embodiments may comply with privacy policies as further described herein. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, privacy settings may be determined for particular types of objects associated with a user. As an example and not by way of limitation, different privacy settings may be set for different types of content that are shared by a user. As an example and not by way of limitation, a first user may specify that their status updates are public, but any images shared by the first user are only visible to the first user's friends on social-networking system 160. As another example and not by way of limitation, a user may specify different privacy settings for different types of entities, such as individual users, friends-of-friends, followers, user groups, or corporate entities. As an example and not by way of limitation, a first user may specify a group of users who may view videos posted by the first user, while keeping the videos from being visible by his or her employer. In particular embodiments, different privacy settings may be provided for different user groups or user demographics. As an example and not by way of limitation, a first user may specify that other users that attend the same university as the first user may view the first user's pictures, but that other users comprising the first user's family may not view those same pictures.

In particular embodiments, social-networking system 160 may provide a default privacy setting with respect to each type of object, and the user may edit any or all of the privacy settings. In particular embodiments, changes to privacy settings may take effect retroactively, affecting the visibility of objects and content shared prior to the change. As an example and not by way of limitation, a first user may share a first image, and specify that the first image is to be public to all other users. At a later time, the first user may specify that any images shared by the first user should be made only visible to a first user group. Social-networking system 160 may determine that this privacy setting also applies to the first image, and make the first image only visible to the first user group. In particular embodiments, the change in privacy settings may only take effect going forward. Continuing the example above, if the first user changes privacy settings then shares a second image, the second image may only be visible to the first user group, but the first image may remain visible to all users.

In particular embodiments, privacy settings for a first user may affect how the first user is able to view content associated with second users. As an example and not by way of limitation, a first user may view a number of posts, status updates, or other content uploaded to social-networking system 160 by a second user. In particular embodiments, the first user may wish to view fewer posts related to the second user, without altering the edge connection between them (e.g. the first user wishes to remain friends with the second user). In particular embodiments, the visibility of a particular second user's posts to the first user may be based on the social affinity between the first user and the second user. In particular embodiments, if the first user indicates that he or she wishes to view fewer posts of the second user, social-networking system 160 may adjust the social affinity coefficient of the second user with respect to the first user. In particular embodiments, this may reduce the frequency of posts of the second user appearing in the first user's newsfeed. As an example and not by way of limitation, if the first user indicates that he or she wishes to view fewer posts by the second user, social-networking system 160 may adjust the affinity coefficient of the first user with respect to the second user to zero, which may reset the relationship between the first user and the second user to baseline levels.

In particular embodiments, privacy settings may be based on one or more nodes or edges of a social graph 200. In particular embodiments, a privacy setting may be determined for a particular edge of social graph 200, or with respect to a particular node of social graph 200. As an example and not by way of limitation, a first user may share a content item to social-networking system 160. The content item may be associated with a concept node 204 connected to a user node 202 of the first user by an edge 206. The first user may specify privacy settings which may apply to the particular edge 206 connecting to the concept node 204 of the content item. In particular embodiments, the privacy settings applied to the particular edge 206 may govern the content item's visibility to other users associated with the first user.

In particular embodiments, a user may specify privacy settings for particular edge types. As an example and not by way of limitation, social-networking system 160 may recognize that all edges 206 connecting a user node 202 to concept nodes 204 corresponding to video content are a single edge type. The user of user node 202 may specify that all videos associated with the user should be under particular privacy settings. Social-networking system 160 may then apply the privacy settings to each edge 206 connecting user node 202 to all concept nodes 204 comprising video. As another example and not by way of limitation, a first user may share an image depicting a plurality of other users, and the sharing may include tags indicating the other users depicted in the image. The first user may specify privacy settings wherein only the other users tagged in the image are able to view the image, while the image remains hidden from users who are not tagged in the image.

In particular embodiments, the user's privacy settings may be applied to a concept node 204 of the content item directly. As an example and not by way of limitation, a user may provide privacy settings for a content item having a concept node 204. The privacy settings may specify that no other user of social-networking system 160 is permitted to view the content item. This setting may be applied to all potential edges 206 connecting to the concept node 204 of the content item, so that even if other users were to establish edge connections with the content item, they would not be able to view the content item.

In particular embodiments, a user may specify privacy settings for a particular object where the object may be sent to another user or entity, without social-networking system 160 having access to the object. As an example and not by way of limitation, a first user of social-networking system 160 may wish to send content to a second user, without any other users or social-networking system 160 having access to the content. In particular embodiments, social-networking system 160 may have access to the object temporarily in order to send the object through social-networking system 160 to the recipient. In particular embodiments, a user may provide privacy settings for a category of objects or a category of users. As an example and not by way of limitation, a user may specify that no images sent by the user through social-networking system 160 may be stored by social-networking system 160. As another example and not by way of limitation, a first user may specify that no content that is sent from the first user to a particular second user can be stored by social-networking system 160. As yet another example and not by way of limitation, a user may specify that all content sent through a particular application of his or her computing device may be saved by social-networking system 160.

In particular embodiments, social-networking system 160 may determine that one or more privacy settings associated with a first user may need to be changed in response to a trigger action. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, social-networking system 160 may prompt the first user to provide new privacy settings regarding the visibility of objects associated with the first user. The prompt may redirect the first user to a workflow process for editing privacy and content settings with respect to one or more entities associated with the trigger action. The privacy settings associated with the first user may only be changed in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, users may specify privacy settings for particular types of information received by social-networking system 160 and associated with the user. A user may specify that social-networking system 160 may access particular information provided by the user or a computing device associated with the user, in order for social-networking system 160 to provide a particular function or service to the user, without social-networking system 160 having access to that information for any other purposes. As an example and not by way of limitation, a user may utilize a location services feature of social-networking system 160 to provide recommendations for restaurants or other places in proximity to the user. The user may provide privacy settings to specify that social-networking system 160 may use location information provided from a mobile device of the user to provide the location services, but that social-networking system 160 may not save the location information of the user or provide it to any third-party entities.

In particular embodiments, privacy settings may be specified for each of a plurality of applications on a computing device associated with a user. As an example and not by way of limitation, a particular user may be associated with a mobile computing device running a messaging application associated with social-networking system 160, an image-sharing application associated with social-networking system 160, and a search application associated with social-networking system 160. Social-networking system 160 may determine default privacy settings for each application of the mobile computing device. In particular embodiments, when the user initially launches each of the applications associated with social-networking system 160, the application may prompt the user to provide a privacy setting for that application. In particular embodiments, the application prompt may include individual privacy settings for a plurality of user actions available for that application. As an example and not by way of limitation, when a user first launches an image-sharing application on their mobile computing device, the application may ask the user to provide privacy settings for: images posted by the user; images posted by the user where the user is tagged in the image; images posted by other users where the user is tagged in the image; video files where the user is tagged; or posts where the user is tagged.

In particular embodiments, the privacy setting associated with an object may require a second layer of user verification before the object is visible to other users. As an example and not by way of limitation, a user's default privacy settings may indicate that a particular type of user action is visible to a set of users. However, social-networking system 160 may determine that a specific user action is related to a topic or situation that may require heightened privacy. As an example and not by way of limitation, a user's posts comprising the user's status updates may normally be visible to all friends of the user on social-networking system 160. However, the user may then post a status update related to a topic sensitive to the user, such as the end of a relationship. Social-networking system 160 may determine that the particular post is very sensitive, and send a prompt to the user reminding the user of his or her privacy settings, and provide an option for the user to change his or her default privacy settings, or alter his or her privacy settings only with respect to the particular post.

In particular embodiments, social-networking system 160 may send a reminder to a user of his or her privacy setting in response to a user action associated with that privacy setting. As an example and not by way of limitation, a user may specify a set of privacy settings identifying a set of users who are permitted to view images posted by the user on social-networking system 160. If the user subsequently posts a photo to social-networking system 160, the user may receive an indication of the current privacy settings of the user, and an identification of the set of users who will be able to access the photo. In particular embodiments, the indication may include user inputs to permit the user to continue with sharing the photo to the set of users, cancel the sharing of the photo, or to edit the set of users who may view the photo. In particular embodiments, the reminder may be sent every time the user engages in a user action associated with the privacy setting. In particular embodiments, the reminder may be sent periodically based either on time elapsed or a number of user actions. As an example and not by way of limitation, social-networking system 160 may send a reminder to the user every 10th time the user posts a status update. As another example and not by way of limitation, social-networking system 160 may send a reminder once a week, with the user's first user action in a particular week resulting in the reminder being sent.

Figure 3:
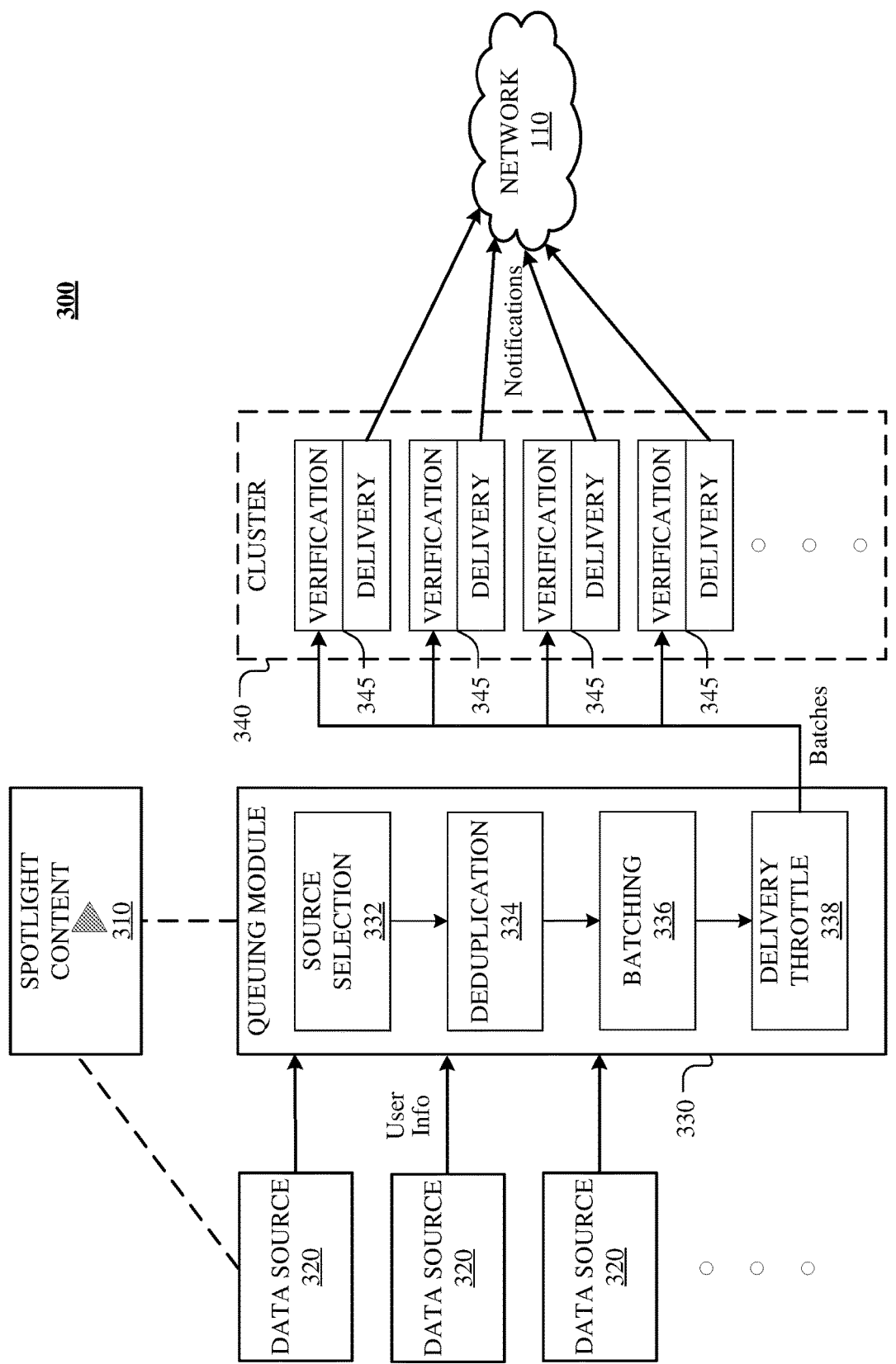
FIG. 3 illustrates an example architecture for delivering notifications to users.

FIG. 3 illustrates an example architecture 300 for delivering notifications to users. In particular embodiments, a spotlight content item 310 may be made available on the social-networking system 160. The spotlight content item 310 may be created and posted on the social-networking system 160 by a user. It may alternatively be stored on a third-party system 170 and linked to the social-networking system 160. The spotlight content item 310 may be of one of a plurality of formats, which may comprise a text-based post, an image, a video and/or audio recording, a live video broadcast, or a downloadable software product or service. The spotlight content item 310 may be associated with one or more user nodes 202 or concept nodes 204 in a social graph 200 associated with the social-networking system 160. The spotlight content item 310 may be associated with a user node 202 for a plurality of reasons, such as that the spotlight content item 310 is created by a user corresponding to the user node 202, that the spotlight content item 310 or a link to the spotlight content item 310 is posted on a profile page associated with the user node 202, or that the content of the spotlight content item 310 involves a user corresponding to the user node 202. The spotlight content item 310 may be associated with a concept node 204 for a plurality of reasons, such as that the spotlight content item 310 is represented by the concept node 204, that the spotlight content item 310 is created by an entity corresponding to the concept node 204, that the spotlight content item 310 is associated with a location corresponding to the concept node 204, that a topic of the spotlight content item 310 is associated with a theme of the concept node 204, or that the spotlight content item 310 is stored on a third-party system 170 corresponding to the concept node 204. In particular embodiments, the spotlight content item 310 may be associated with a timescale. The timescale may be defined by an availability of the spotlight content item 310, a duration of the spotlight content item 310, an interest span of an intended audience of the spotlight content item 310, or an intent of a creator of the spotlight content item 310. The timescale may be stored as a schedule. It may alternatively be determined or estimated based on one or more characteristics of the spotlight content item 310 or historical data of the spotlight content item 310 or similar content items.

In particular embodiments, in response to the spotlight content item 310 becoming available on the social-networking system 160, the notification system may access one or more data sources 320 containing user information. The user information obtained by the notification system may comprise social-networking information such as identification information, profile information, an interaction history with content items, and a history of receiving notifications. The data sources 320 may be implemented on one or more data stores 164 of the social-networking system 160. Alternatively, the data sources 320 may be implemented on a third-party system 170. In particular embodiments, a data source 320 may be associated with the spotlight content item 310. The relationship between the data source 320 and the spotlight content item 310 may be based on a creator of the spotlight content item 310, an individual involved in the spotlight content item 310, a topic of the spotlight content item 310, a characteristic of the spotlight content item 310, or a location of the spotlight content item 310. A data source 320 may be precomputed by the social-networking system 160 offline, updated regularly, and stored. Alternatively, a data source 320 may be created in real time in response to the creation or posting of the spotlight content item 310. Within each data source 320, users may be ranked based on one or more criteria associated with the spotlight content item 310. One or more criteria may be based on social-networking information for each of the users. The ranking of each user may be precomputed or be determined in real time. In particular embodiments, a criterion may comprise a type of relationship between a node 202 representing each user and a node 202/204 associated with the spotlight content item 310, an interaction history between each user and the node 202/204 associated with the spotlight content item 310, or an interaction history between each user and one or more content items determined to be similar to the spotlight content item 310. In particular embodiments, a criterion may be based on information that may be obtained from a client system 130 of each user, such as a type of the client system 130, a capability of the client system 130 in displaying a particular type of media, a type of I/O device equipped on the client system 130, a connectivity to the internet, or a reading of a sensing device equipped on the client system 130. Such information may be obtained by the social-networking system 160 with proper authorization from the users.

In particular embodiments, the notification system may comprise a queuing module 330. The queuing module may comprise a source selection module 332, a deduplication module 334, a batching module 336, and a delivery throttle 338. The source selection module 332 may be operable to select a particular data source 320 to access at a particular time and determine a number of users to obtain from the data source 320. Alternatively, the source selection module 332 may determine an order of the data sources 320 to access. The rules may be based on a relationship between each data source 320 and the spotlight content item 310, a time it takes to access or create each data source 320, a size of each data source 320, or a method of ranking associated with each data source 320. In particular embodiments, the queuing module 330 may aggregate user information obtained from more than one data sources 320 and sort them into a list for notification delivery. The sorted list of users may be created based on a set of predetermined rules. For example, the rules may direct the notification system to sort the users based on a rank of each user within a data source 320 and the order of data sources 320. The sorted list of users may be stored in one or more storage devices associated with the queuing module 330 and updated when the queuing module 330 obtains additional user information from one or more data sources 320 or when the queuing module 330 sends batches of users out for notification delivery. When information about a particular user is obtained from at least two different data sources 320, the deduplication module 334 may remove redundant instances of the user information. In particular embodiments, the deduplication module 334 may maintain a record of identification information for all users who have been delivered a particular notification or who have been scheduled to receive a particular notification and compare each newly-accessed user with the record. In particular embodiments, the deduplication module 334 may access more than one set of users from different data sources 320 and combine the sets of users through a union set operation to remove redundant user information. In particular embodiments, the batching module 336 may place the ordered list of users into one or more batches according to a batching protocol. The batches may then be sent to a clustered computer system 340, which is operable to deliver notifications to users received from the queuing module 330 in a parallel manner. The batching protocol may be based in part on rankings for users. In particular embodiments, the batches and users in each batch may be ordered. The batching module 336 may determine the orders based on a plurality of factors, which may comprise the ranking of each user within the user's data source 320, the time of access for a data source 320, the importance of a data source 320, a relationship between a data source 320 and the spotlight content item 310, or the fairness among different data sources 320. In particular embodiments, the batching module 336 may determine a number and size of batches to create. This may be done by balancing one or more factors, which may comprise an interest in expanding the overall notification recipient pool to be as large as possible, an interest in notification delivery speed, which may favor smaller batches, and the limitation of the infrastructure, which may limit the number of batches that the notification system may possibly break the users into. Here, the limitation of the infrastructure may depend on a number of nodes 345 in the clustered system 340 and one or more competing content items, which may also require notification delivery. Alternatively, the number and sizes of batches may be based on explicit instructions. In particular embodiments, the delivery throttle 338 may be operable to control the speed of transmitting user information to the clustered computer system 340, which may then influence the speed of delivering notifications to the users. The queuing module 330 may be operable to monitor status of the spotlight content item 310, the social-networking system 160, and the clustered computer system 340 and determine an appropriate speed of transmitting user information based on a plurality of factors, which may comprise a status of the spotlight content item 310, an availability of one or more data sources 320, a load on the clustered computer system 340, one or more competing notifications to deliver, or a feedback from one or more notification recipients.

In particular embodiments, the notification system may comprise a clustered computer system 340, each node 345 of which being operable for user verification and notification delivery. Each node 345 of the clustered computer system 340 may receive one or more batches of user information from the queuing module 330 and cache the received user information in one or more storage devices. In particular embodiments, each node 345 may be operable to verify each received user against one or more requirements associated with the spotlight content item 310 to determine whether delivering a notification to the user is appropriate. The verification process for each user may comprise checking user information received from the queuing module 330, social-networking information directly obtained from the social-networking system 160, and device information obtained from a client system 130 of the user. The social-networking information may comprise recent interactions by the user with social-networking information corresponding to a node 202/204 associated with the spotlight content item 310. The recent interactions may comprise liking a content item associated with the node 202/204, commenting on a content item associated with the node 202/204, sharing a content item associated with the node 202/204, visiting a profile page associated with the node 202/204, or subscribing to or unsubscribing from a service associated with the node 202/204. If the user satisfies each requirement, the node 345 may confirm and send the notification to the user. On the other hand, if the user fails to satisfy each requirement, the node 345 may eliminate the user from a list of candidate notification recipients. In particular embodiments, verifying a user may comprise checking privacy settings of the user to ensure compliance, checking the connectivity to the social-networking system 160 of one or more devices 130 associated with the user to ensure capability of receiving the notification, determining the characteristics of one or more devices 130 associated with the user to ensure capability of accessing the spotlight content item 310, or determining whether a number of recent notifications received by the confirmed user exceeds a threshold. In particular embodiments, the verification process may necessitate redistributing users among one or more batches to achieve fair and efficient use of computing resources. Redistributing users may comprise combining remaining users of two batches into one, splitting one batch into two or more batches, or moving one or more users of one batch into another. Redistribution may be conducted by the batching module 336 or an additional layer of software executable to batch confirmed users received from the clustered computer system 340. In particular embodiments, each node 345 of the clustered computer system 340 may send a notification about the spotlight content item 310 to each of the confirmed users in accordance with a batching protocol. Collectively, the notification may be delivered to a plurality of users in a parallel manner through the simultaneous operations of a plurality of nodes 345 of the clustered computer system 340. The clustered computer system 340 may be connected to the network 110, which may be connected to one or more client systems 130. The notification may therefore be delivered through the network 110. Alternatively, the clustered computer system 340 may send the notification, information associated with the confirmed users, and appropriate instructions to a notification distribution service, which is connected to the client systems 130 via the network 110, for indirect notification delivery.

Figure 4A:
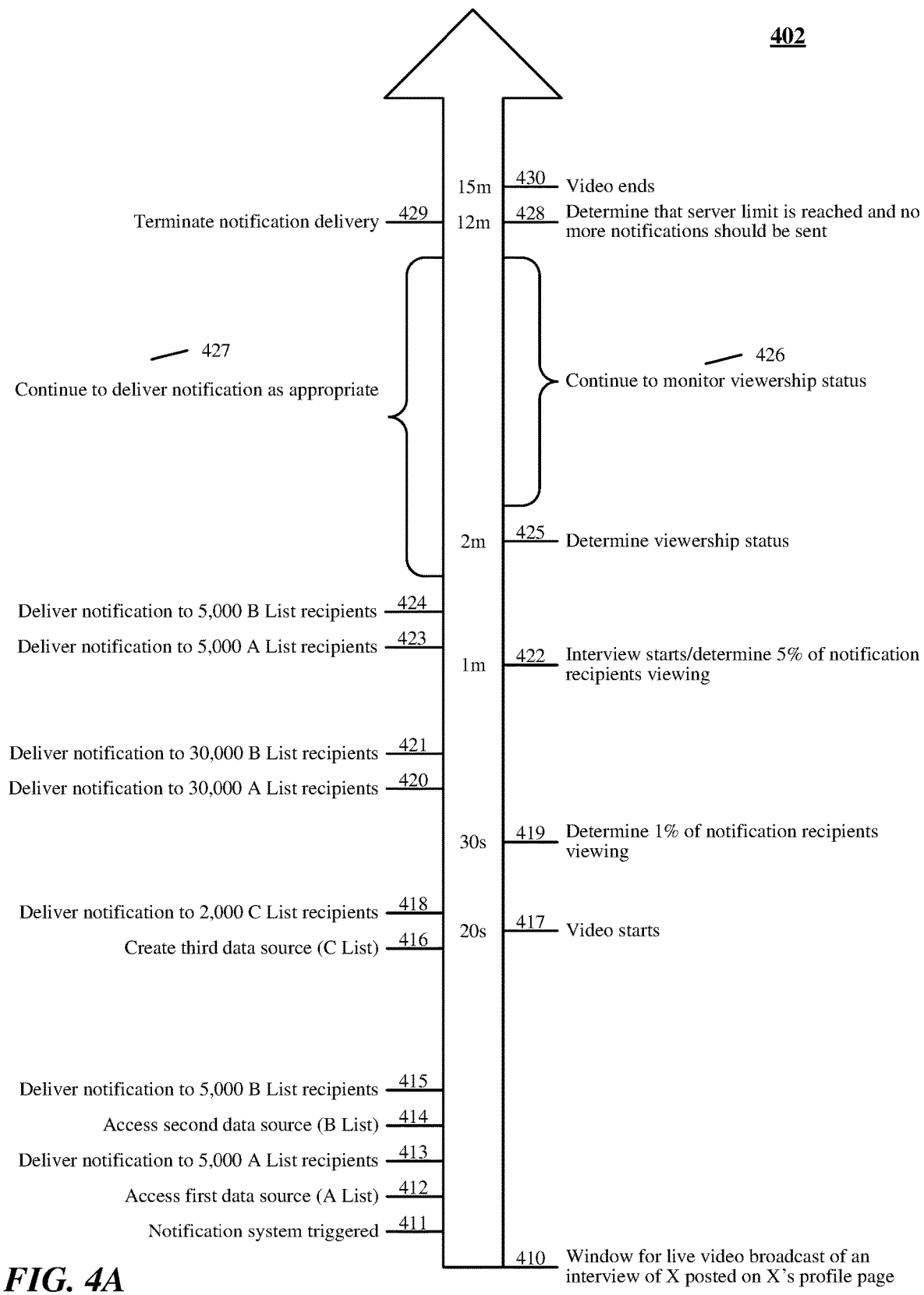
FIGS. 4A-4C illustrate example applications of the notification system depending on the nature of the spotlight content item.
Figure 4B:
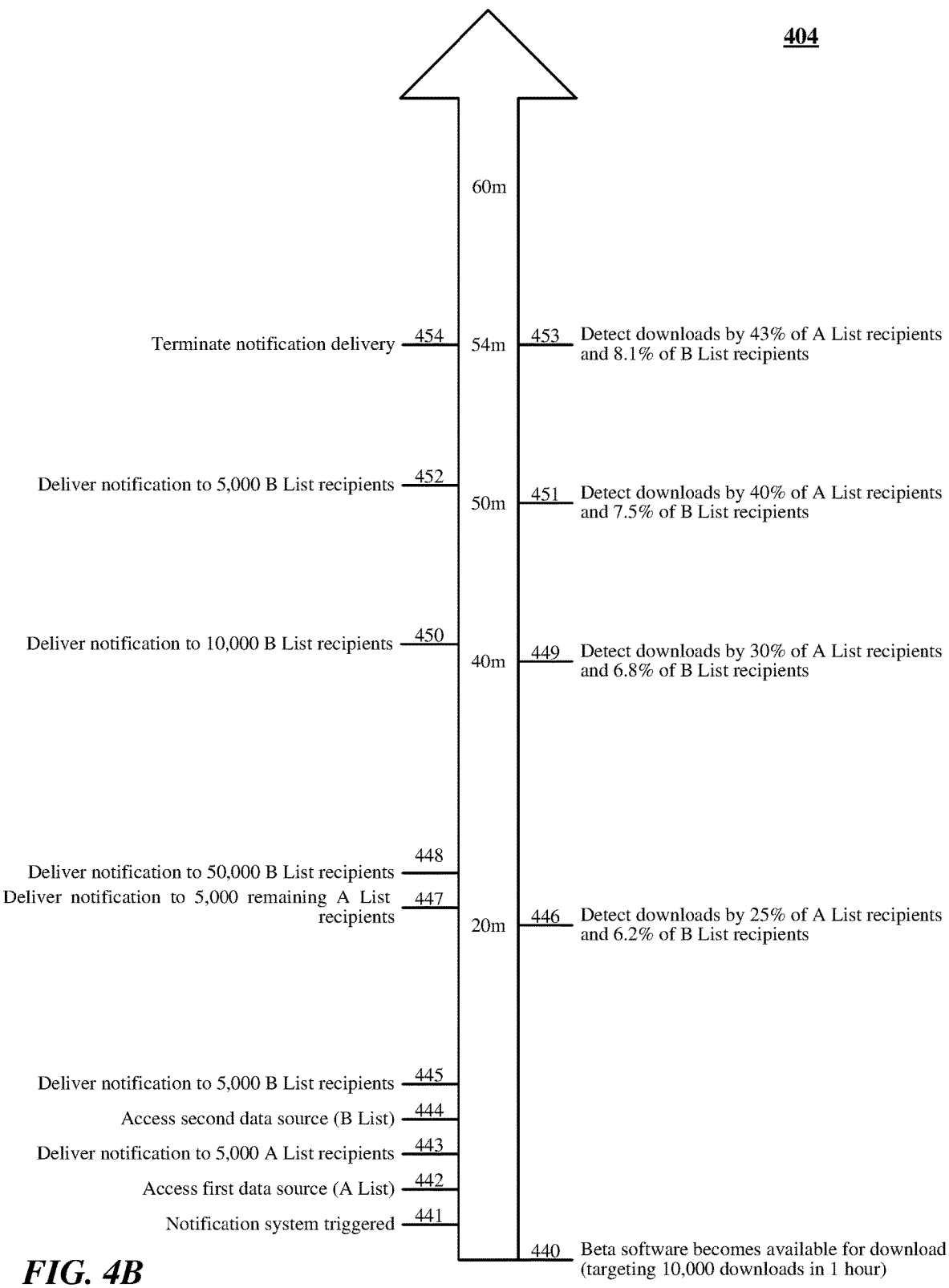
Figure 4C:
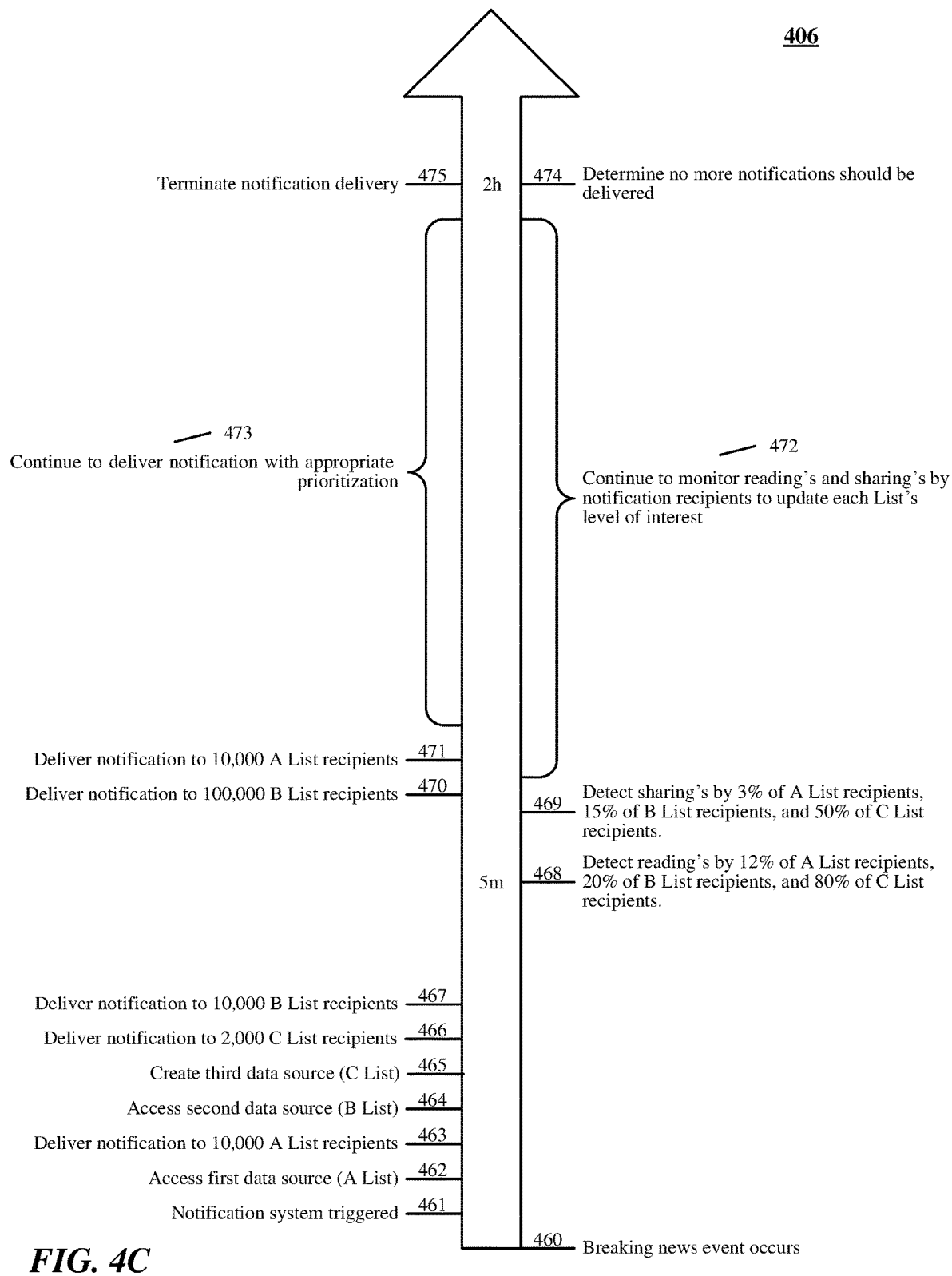

FIGS. 4A-4C illustrate example applications of the notification system depending on the nature of the spotlight content item. Each of FIGS. 4A-4C illustrates, using a timeline, the notification system delivering notifications about a particular spotlight content item 310. An arrow is used to illustrate the time axis in each timeline. The left side of the arrow illustrates example actions of the notification system. The right side of the arrow illustrates example events that may occur outside the notification system and be detected by the notification system. In FIGS. 4A-4C, there may not be a correlation between a length of a part of an arrow and a length of time illustrated by the part of the arrow. Furthermore, in the example application scenarios of the notification system illustrated by FIGS. 4A-4C and described below, all the specific numbers used (e.g., to describe a moment in a timeline, a length of time, a number of users, a number of batches, a size of a batch, a number of nodes, a percentage) are given by way of example and not limitation, as a person having ordinary skill in the art would understand that embodiments of the notification system may be applied in scenarios with one or more of the example numbers changed.

FIG. 4A illustrates an example application 402 of the notification system in sending notifications about a spotlight content item 310, which is a live video broadcast. In particular embodiments, a window for a live video broadcast of an interview of a celebrity X may be posted 410 on X's profile page in the social-networking system 160. For illustration purposes, this event marks the beginning of time (e.g. 0 second) for this timeline. Here, the live video broadcast is at least associated with a user node 202 corresponding to X. In particular embodiments, the live video broadcast may appear on X's profile page without notice in advance and be featured as an opportunity for X's fans to connect with X in real time. It may be provided through a real-time live broadcast service such as Facebook Live. Given the nature of the spotlight content item 310, it may be desirable to notify a large number of potentially interested individuals in a short time to attract them to view and interact with the spotlight content item 310. It may further be desirable to give priority to X's most loyal and active fans to reward their loyalty.

In particular embodiments, the posting 410 of the spotlight content item 310 may cause the notification system to be triggered 411. For example, the posting 410 of the spotlight content item 310 may cause a signal, which may comprise information about the spotlight content item 310 and the nodes 202/204 it is associated with, to be sent to the notification system, which triggers 411 the notification system. Alternatively, the notification system may be associated with one or more listeners monitoring the status of X's profile page. The listeners may trigger 411 the notification system upon detecting the posting 410 of the spotlight content item 310. When the notification system is triggered, it may generate a notification about the spotlight content item 310. Then, the notification system may identify a first data source 320 ("A List") and a second data source 320 ("B List") associated with the spotlight content item 310. A List and B List may each comprise information about a large number of users. They may be precomputed and be available immediately. As an example and not by way of limitation, A List may comprise information about users who have commented on X's profile page during a particular time period (e.g., the past three months). Users of A List may be ranked based at least in part on a count of their comments on X's profile page during the time period. B List may comprise information about users who are subscribers to a news feed related to X. Users of B List may be ranked based at least in part on the timing of their subscriptions. The most recent update to B List may be made one week ago. The notification system may access 412 A List to obtain user information and deliver 413 the notification to 5,000 top-ranked A List recipients. The 5,000 A List recipients may be distributed into 10 batches of 500 users. 10 nodes 345 of the clustered computer system 340 may deliver 413 the notification to A List recipients in parallel. Similarly, the notification system may then access 414 B List to obtain user information and deliver 415 the notification to 5,000 top-ranked B List recipients. At the same time or after the notification is delivered to A List and B List recipients, the notification system may create 416, in real time, a third data source 320 ("C List"). This data source 320 may not be suitable for pre-computation. For example, C List may comprise user information of users who has become subscribed to the news feed about X since the last time B List was updated (e.g., one week ago). The notification system may analyze related social-networking information in real time to populate C List, which may comprise information about a relatively small number of users (e.g., 2,000). The delay associated with creating C List may cause it to become available after A List and B List. Although C List may be determined to have a higher priority over A List and B List, its delayed availability may cause delayed delivery of the notification to C List recipients. The notification system may deliver 418 the notification to all C List recipients. For example, 10 nodes 345 of the clustered computer system 340 may deliver 418 the notification to 10 batches of 200 C List recipients in parallel. While the notification system delivers the notification to C List recipients, the live video broadcast may start 417 at 20 seconds.

In particular embodiments, the controlling module of the notification system may control the pace of notification delivery by monitoring status of the spotlight content item 310 and reactions of notification recipients. In this example application, given the nature of the spotlight content item 310, the controlling module may be configured to take into consideration: an interest in notifying potentially interested users as soon as possible, an interest in limiting the number of notification recipients before confirming the validity of the spotlight content item 310, limitations of the clustered computer system 340, and limitations of a server 162 in providing the spotlight content item 310. Before the video starts, the controlling module may direct the notification system to deliver the notification to a relatively small number of recipients (e.g., 5,000 A List, 5,000 B List, and 2,000 C List) because the spotlight content 310 item may still be cancelled. After the broadcast starts, the controlling module may determine 419 a number or percentage of notification recipients watching the spotlight content item 310. For example, the controlling module may determine 419 that only 1% of all notification recipients are watching at 30 seconds. Based on this determination, the controlling module may direct the notification system to increase the speed of notification delivery. The notification system may then deliver 420, 421 the notification to 30,000 A List recipients and 30,000 B List recipients. This speed may approach the limitations of the clustered computer system 340. For example, the clustered computer system 340 may comprise 30 nodes 345 each capable of caching information about 1,000 recipients at a time. The interview of X may start 422 at 1 minute, when the controlling module may again determine 422 a percentage of notification recipients watching the spotlight content item 310. For example, the determination may yield a 5% value. Based on this determination 422, the controlling module may direct the notification system to reduce the speed of notification delivery due to server limitations. For the next round, the notification may deliver 423, 424 the notification to 5,000 A List recipients and 5,000 B List recipients. At 2 minutes, the controlling module may determine 425 viewership status again. Subsequently, the notification system may continue to monitor 426 viewership status of the spotlight content item 310 and deliver 427 the notification as appropriate. In particular embodiments, the notification system may determine that A List and B List have a similar level of priority and continue to deliver the notification to a roughly equal number of A List and B List recipients. At a particular time point (e.g., 12 minutes), the controlling module may determine 428 that a count of viewers reach a particular number (e.g., 10,000), which is the maximum number of spotlight content item sessions a server 162 of the social-networking system 160 is capable of providing. The notification system may then terminate 429 notification delivery. Finally, the live video broadcast may end 430 at 15 minutes.

FIG. 4B illustrates an example application 404 of the notification system in sending notifications about a spotlight content item 310, which is a beta software product or service. In particular embodiments, a beta software product or service may become 440 available for download. A link to a download webpage of the beta software's developer's website may be provided on the social-networking system 160. For illustration purposes, this event marks the beginning of time (e.g. 0 second) for this timeline. Here, the beta software is at least associated with a concept node 204 corresponding to its developer and a concept node 204 corresponding to its software family. The developer may desire to attract a certain number (e.g., 10,000) of test users to download the beta software within particular time (1 hour).

In particular embodiments, the notification system may be triggered 441 after the beta software becomes 440 available for download. For example, the developer of the spotlight content item 310 may explicitly send a signal to the notification system specifying the spotlight content item 310 and the developer's testing plan. When the notification system is triggered, it may generate a notification about the spotlight content item 310. The notification system may subsequently access 442 a precomputed first data source 320 ("A List") to obtain user information and deliver 443 the notification to 5,000 top-ranked A List recipients. As an example and not by way of limitation, A List may comprise information about 10,000 social-networking users who are test users of a previous version of the current beta software. Users of A List may be ranked based on how quickly each downloaded the previous version of the software after being notified about it. The information may be used to predict the users' reactions this time. The notification system may also access 444 a pre-computed second data source 320 ("B List") to obtain user information and deliver 445 the notification to 5,000 B List recipients. As an example and not by way of limitation, B List may comprise information about a large number of users in an email list of the developer, ranked based on each's history of interactions with emails from the developer.

In particular embodiments, the controlling module of the notification system may control the pace of notification delivery by monitoring reactions of notification recipients. In this example application, the controlling module may be configured based on the notification sender's (e.g., the developer's) goal of attracting 10,000 test users in 1 hour. The controlling module may treat the initial 5,000 A List recipients and 5,000 B List recipients as an "assessment group." At 20 minutes, the controlling module may determine 446 a percentage (number) of A List and B List recipients who have downloaded the beta software. For example, it may determine 446 that 25% (1,250) of A List recipients and 6.2% (310) of B List recipients have downloaded the beta software. The controlling module may predict, based on the determination, that the goal of 10,000 test users will not be achieved if the notification is delivered at the current rate. It may direct the notification system to increase the speed of notification delivery by delivering 447 the notification to the 5,000 remaining A List users and delivering 448 the notification to 50,000 B List recipients. Similarly, the controlling module may continue to monitor the reactions of notification recipients and control the pace of notification delivery in order to achieve the developer's goal. For example, in response to a determination 449 at 40 minutes that 30% (3,000) of A List recipients and 6.8% (3,740) of B List recipients have downloaded the beta software, the notification system may deliver 450 the notification to 10,000 additional B List recipients. In response to a determination 451 at 50 minutes that 40% (4,000) of A List recipients and 7.5% (4,875) of B List recipients have downloaded the beta software, the notification system may deliver 452 the notification to 5,000 B List recipients. Finally, at 54 minutes, the controlling module may determine 453 that 43% (4,300) of A List recipients and 8.1% (5,700) of B List recipients have downloaded the beta software. The goal of 10,000 test users is thus achieved. The notification may then terminate 454 notification delivery immediately.

FIG. 4C illustrates an example application 406 of the notification system in sending notifications about a spotlight content item 310, which is a breaking news article. In particular embodiments, a breaking news event may occur 460. A breaking news article may be written and posted on the social-networking system 160. Alternatively, a breaking news article may be published on a third-party system 170 and linked to the social-networking system 160. For illustration purposes, this event marks the beginning of time (e.g., 0 seconds) for this timeline. Here, the breaking news event is at least associated with concept nodes 204 corresponding to a topic and a location of the events and users nodes 202 corresponding to one or more individuals involved in the event. It may be desirable to notify as many interested people about the breaking news as possible within a time period in which the event has high news value.

In particular embodiments, the notification system may be triggered 461 when the breaking news article is published. When the notification system is triggered, it may generate a notification about the spotlight content item 310. At this time, a precomputed first data source 320 ("A List") may be the only data source 320 available to the notification system. As an example and not by way of limitation, A List may comprise information about a large number of users who are determined to be interested in a topic of the event. The users may be ranked at least in part based on a level of interest associated with each user. The notification system may access 462 A List to obtain user information and deliver 463 the notification to 10,000 top-ranked A List recipients. A precomputed second data source 320 ("B List") may become available to the notification system. The availability of B List may be delayed because it was stored in a remote storage device connected to the notification system through a network connection. As an example and not by way of limitation, B List may comprise information about a large number of users who are located near a location of the breaking news event. Users of B List may be ranked based at least in part on each's distance to the location of the breaking news event. The notification system may access 464 B List to obtain users information. Immediately after, the notification system may finish creating 465, in real time, a third data source 320 ("C List"). This data source 320 may not be suitable for pre-computation. For example, C List may comprise user information of users who are socially connected to individuals involved in the breaking news event. The notification system may analyze related social-networking information in real time to populate C List, which may comprise information about a relatively small number of users (e.g., 2,000). The delay associated with creating C List may cause it to become available after A List and B List. However, the users of C List may be determined to be more interested in the breaking news than users of A List or B List. Therefore, the notification system may give C List a higher priority, pause notification delivery to B List recipients, and deliver 466 the notification to all C List recipients. The notification system may subsequently deliver 467 the notification to 10,000 top-ranked B List recipients.

In particular embodiments, the controlling module of the notification system may dynamically control the priority of different data sources 320. At 5 minutes, the controlling module may determine 468 a percentage of reading's by notification recipients of each data source 320. For example, the controlling module may determine 468 that 12% of A List recipients, 20% of B List recipients, and 80% of C List recipients have read the breaking news article. Similarly, the controlling module may determine 469 that 3% of A List recipients, 15% of B List recipients, and 50% of C List recipients have shared the breaking news article. Because both reading and sharing are beneficial for spreading the breaking news to more people, which is the goal of the current example application, the controlling module may assign a higher priority to B List than A List based on the determinations. In response, the notification system may deliver 470 the notification to a larger number of B List recipients earlier than delivering 471 the notification to a smaller number of A List recipients. Subsequently, the controlling module may continue to monitor 472 reading's and sharing's by notification recipients to update a characteristic level of interest assigned to each data source 320. The notification system may deliver 473 notifications with appropriate prioritization based on the characteristic levels of interest. Finally, at a particular time point (e.g., 2 hours) that is predetermined or determined in real time, when the breaking news is believed to not be "breaking" any more or to have a significantly reduced news value, it may be determined 474 that no more notifications should be delivered. The notification system may terminate 475 notification delivery.

Figure 5:
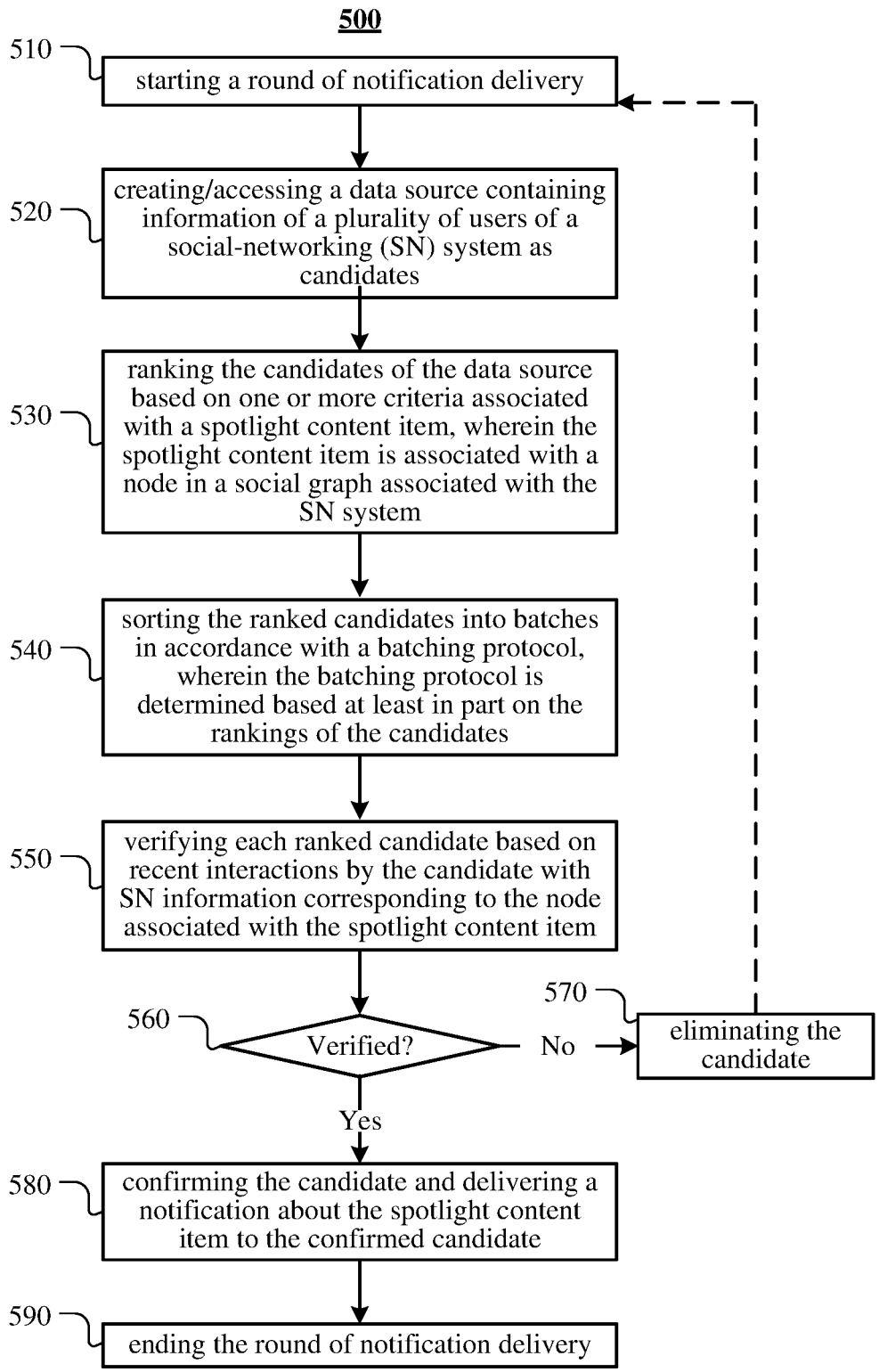
FIG. 5 illustrates an example method for handling content-based notification delivery to users.

FIG. 5 illustrates an example method for handling content-based notification delivery to users. The method may begin at step 510, where the notification system may start a round of notification delivery. At step 520, the notification system may create or access a data source 320 containing information about a plurality of users of a social-networking system 160 as candidates. At step 530, the notification system may rank the candidates of the data source 320 based on one or more criteria associated with a spotlight content item 310, wherein the spotlight content item 310 is associated with a node 202/204 in a social graph 200 associated with the social-networking system 160. Alternatively, the candidates may be ranked within the data source 320 before the notification system accessing the data source 320. At step 540, the notification system may sort the ranked candidates into batches, in accordance with a batching protocol, wherein the batching protocol is determined based at least in part on the rankings of the candidates. At step 550, the notification system may verify each ranked candidate based on recent interactions by the candidate with social-networking information corresponding to the node 202/204 associated with the spotlight content item 310. At step 560, the notification system may determine whether a candidate is verified. If the candidate is not verified, the notification system may eliminate the candidate from a pool of candidates to be delivered a notification at step 570. Otherwise, if the candidate is verified, the notification system may confirm the candidate and deliver a notification about the spotlight content item 310 to the confirmed candidate at step 580. At step 590, after the notification is delivered to each confirmed candidate, the notification system may end the round of notification delivery. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for handling content-based notification delivery to users including the particular steps of the method of FIG. 5, this disclosure contemplates any suitable method for handling content-based notification delivery to users including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
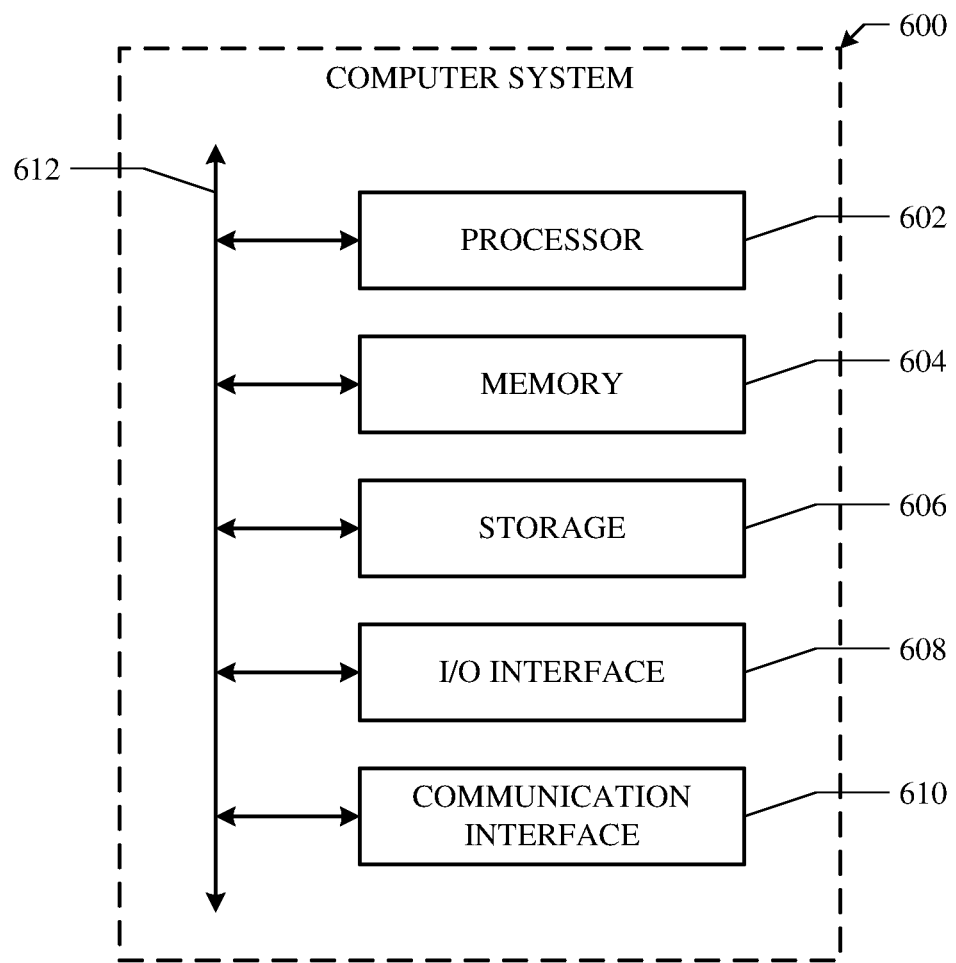
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
    sending a notification about a spotlight content item to a first batch of a plurality of users of a social-networking system in a parallel manner using a clustered computing system;
    receiving information about reactions of the first batch of users;
    after sending the notification about the spotlight content item to the first batch of the plurality of users of the social-networking system, determining a time for sending the notification about the same spotlight content item to a second batch of the plurality of users of the social-networking system based on an interpretation value associated with the received information about reactions of the first batch of users on the notification about the spotlight content item sent to the first batch of the plurality of users, wherein the determination of the time is based on achieving a reaction metric goal for the spotlight content item; and
    sending the notification about the spotlight content item to the second batch of users at the determined time in a parallel manner using a clustered computing system.

2. The method of claim 1, wherein the first batch and the second batch of the users are determined including by:
    ranking the plurality of users of the social-networking system based on one or more criteria associated with the spotlight content item;

verifying at least one of the ranked users, wherein the verifying is based on recent interactions by the ranked user with the spotlight content item; and sorting the verified users into one or more batches based on a batching protocol.

3. The method of claim 1, wherein the time for sending the notification is determined based on one or more of the following:

a status of the spotlight content item;

a status of a competing content item;

a statistic about a network used for delivering the spotlight content item;

a status of feedback from a notification recipient; or the reaction metric goal of a creator of the spotlight content item.

4. The method of claim 1, further comprising:

using a controlling module to start, terminate, pause, resume, accelerate, or decelerate sending of notifications to one or more other batches of users.

5. The method of claim 4, further comprising:

determining a deceleration rate for the sending of notifications to the one or more other batches of users or an acceleration rate for the sending of notifications to the one or more other batches of users based on an estimation of progress towards the reaction metric goal of a creator of the spotlight content item.

6. The method of claim 1, wherein the time for sending the notification is determined based on one or more of the following:

an interest in notifying potentially interested users as soon as possible;

an interest in limiting the number of notification recipients before verifying the validity of the spotlight content item;

limitations of the clustered computer system; or limitations of a server in providing the spotlight content item.

7. The method of claim 1, further comprising, after the sending of the notification to the first batch of the plurality of users:

logging information about interactions with the notifications sent to the first batch of the plurality of users, wherein the logged information comprises a type for each of the interactions and timing information for each of the interactions; and adjusting the timing of distribution of subsequent notifications sent to the second batch of users based on the logged information.

8. One or more computer-readable non-transitory storage media embodying software that is operable when executed to:

send a notification about a spotlight content item to a first batch of a plurality of users of a social-networking system in a parallel manner using a clustered computing system;

receive information about reactions of the first batch of users;

after sending the notification about the spotlight content item to the first batch of the plurality of users of the social-networking system, determine a time for sending the notification about the same spotlight content item to a second batch of the plurality of users of the social-networking system based on an interpretation value associated with the received information about reactions of the first batch of users on the notification about the spotlight content item sent to the first batch of the plurality of users, wherein the determination of the time is based on achieving a reaction metric goal for the spotlight content item; and send the notification about the spotlight content item to the second batch of users at the determined time in a parallel manner using a clustered computing system.

9. The media of claim 8, wherein the software determines the first batch and the second batch of the users in that the software is further operable when executed to:

rank the plurality of users of the social-networking system based on one or more criteria associated with the spotlight content item;

verify at least one of the ranked users, wherein the verifying is based on recent interactions by the ranked user with the spotlight content item; and sort the verified users into one or more batches based on a batching protocol.

10. The media of claim 8, wherein the software determines the time for sending the notification in that the software is further operable when executed to:

determine the time for sending the notification to the second batch of users based on one or more of the following:

a status of the spotlight content item;

a status of a competing content item;

a statistic about a network used for delivering the spotlight content item;

a status of feedback from a notification recipient; or the reaction metric goal of a creator of the spotlight content item.

11. The media of claim 8, wherein the software is further operable when executed to:

use a controlling module to start, terminate, pause, resume, accelerate, or decelerate sending of notifications to one or more other batches of users.

12. The media of claim 11, wherein the software is further operable when executed to:

determine a deceleration rate for the sending of notifications to the one or more other batches of users or an acceleration rate for the sending of notifications to the one or more other batches of users based on an estimation of progress towards the reaction metric goal of a creator of the spotlight content item.

13. The media of claim 8, wherein the software determines the time for sending the notification in that the software is further operable when executed to:

determine the time for sending the notification to the second batch of users based on one or more of the following:

an interest in notifying potentially interested users as soon as possible;

an interest in limiting the number of notification recipients before verifying the validity of the spotlight content item;

limitations of the clustered computer system; or limitations of a server in providing the spotlight content item.

14. The media of claim 8, wherein after the sending of the notification to the first batch of the plurality of users the software is further operable when executed to:

log information about interactions with the notifications sent to the first batch of the plurality of users, wherein the logged information comprises a type for each of the interactions and timing information for each of the interactions; and adjust the timing of distribution of subsequent notifications sent to the second batch of users based on the logged information.

15. A system comprising: one or more processors; and a memory coupled to the processors comprising instructions executable by the processors, the processors being operable when executing instructions to:

send a notification about a spotlight content item to a first batch of a plurality of users of a social-networking system in a parallel manner using a clustered computing system;

receive information about reactions of the first batch of users;

after sending the notification about the spotlight content item to the first batch of the plurality of users of the social-networking system, determine a time for sending the notification about the same spotlight content item to a second batch of the plurality of users of the social-networking system based on an interpretation value associated with the received information about reactions of the first batch of users on the notification about the spotlight content item sent to the first batch of the plurality of users, wherein the determination of the time is based on achieving a reaction metric goal for the spotlight content item; and send the notification about the spotlight content item to the second batch of users at the determined time in a parallel manner using a clustered computing system.

16. The system of claim 15, wherein the processors determine the first batch and the second batch of the users in that the processors are further operable when executing instructions to:

rank the plurality of users of the social-networking system based on one or more criteria associated with the spotlight content item;

verify at least one of the ranked users, wherein the verifying is based on recent interactions by the ranked user with the spotlight content item; and sort the verified users into one or more batches based on a batching protocol.

17. The system of claim 15, wherein the processors determine the time for sending the notification in that the processors are further operable when executing instructions to:

determine the time for sending the notification to the second batch of users based on one or more of the following:

a status of the spotlight content item;

a status of a competing content item;

a statistic about a network used for delivering the spotlight content item;

a status of feedback from a notification recipient; or the reaction metric goal of a creator of the spotlight content item.

18. The system of claim 15, wherein the processors are further operable when executing instructions to:

use a controlling module to start, terminate, pause, resume, accelerate, or decelerate the sending of notifications to the one or more other batches of users.

19. The system of claim 18, wherein the processors are further operable when executing instructions to:

determine a deceleration rate for the sending of notifications to the one or more other batches of users or an acceleration rate for the sending of notifications to the one or more other batches of users based on an estimation of progress towards the reaction metric goal of a creator of the spotlight content item.

20. The system of claim 15, wherein the processors determine the time for sending the notification in that the processors are further operable when executing instructions to:

determine the time for sending the notification to the second batch of users based on one or more of the following:

an interest in notifying potentially interested users as soon as possible;

an interest in limiting the number of notification recipients before verifying the validity of the spotlight content item;

limitations of the clustered computer system; or limitations of a server in providing the spotlight content item.

* * * * *